(12) United States Patent
Swab

(10) Patent No.: US 10,975,806 B2
(45) Date of Patent: Apr. 13, 2021

(54) USE OF DECOMPRESSING NATURAL GAS TO LOWER THE INTAKE AIR TEMPERATURE OF AN INTERNAL COMBUSTION ENGINE

(71) Applicant: CARRIER CORPORATION, Palm Beach Gardens, FL (US)

(72) Inventor: Michael Thomas Swab, Acworth, GA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/487,901

(22) PCT Filed: Feb. 20, 2018

(86) PCT No.: PCT/US2018/018657
§ 371 (c)(1),
(2) Date: Aug. 22, 2019

(87) PCT Pub. No.: WO2018/156466
PCT Pub. Date: Aug. 30, 2018

(65) Prior Publication Data
US 2020/0232420 A1 Jul. 23, 2020

Related U.S. Application Data

(60) Provisional application No. 62/462,469, filed on Feb. 23, 2017.

(51) Int. Cl.
*F02M 21/02* (2006.01)
*F02M 21/06* (2006.01)
*F02B 43/00* (2006.01)
*F02D 19/02* (2006.01)

(52) U.S. Cl.
CPC ......... *F02M 21/0215* (2013.01); *F02B 43/00* (2013.01); *F02M 21/06* (2013.01);
(Continued)

(58) Field of Classification Search
CPC ............... F02M 21/0215; F02M 21/06; F02M 21/0212; F02M 21/0239; F02M 21/0245; F02D 19/022
See application file for complete search history.

(56) References Cited

U.S. PATENT DOCUMENTS 4,449,509 A * 5/1984 Young ................ F02M 21/0239
123/527
5,150,690 A * 9/1992 Carter .................... F02B 43/00
123/527
(Continued)

FOREIGN PATENT DOCUMENTS

EP 1213461 * 6/2002 ............. F02M 21/02
EP 1213461 A2 * 6/2002 .......... F02B 29/0443
(Continued)

OTHER PUBLICATIONS

Notification of Transmittal of the Interarntional Search Report for Intatnational Application No. PCT/US2018/018657; Report dated May 17, 2018; 5 pages.
(Continued)

*Primary Examiner* — Syed O Hasan
(74) *Attorney, Agent, or Firm* — Cantor Colburn LLP

(57) ABSTRACT

A fuel system is comprising: a fuel tank; an internal combustion engine; a fuel regulator fluidly connecting the fuel tank to the engine, the fuel regulator being configured to reduce the pressure of the fuel from a first fuel pressure at the fuel tank to a second fuel pressure at the engine; an air supply assembly configured to supply air from an air inlet to the engine, the air assembly comprising: a first air supply line fluidly connecting the air inlet and the engine, the first air supply line being in thermal communication with the fuel regulator; a second air supply line fluidly connecting the air inlet and the engine, the second air supply line being in parallel with the first air supply line; and an air valve
(Continued)

configured to adjust the air flowing through at least one of the first air supply line and the second air supply line.

10 Claims, 2 Drawing Sheets

(52) U.S. Cl.
CPC ....... *F02D 19/022* (2013.01); *F02M 21/0212* (2013.01); *F02M 21/0239* (2013.01); *F02M 21/0245* (2013.01)

(56) References Cited

U.S. PATENT DOCUMENTS

| | | | | |
|---|---|---|---|---|
| 6,932,052 B1 | * | 8/2005 | Fulton ................... | F02D 19/023 |
| | | | | 123/344 |
| 2004/0173192 A1 | * | 9/2004 | Sorter ................ | F02M 21/0239 |
| | | | | 123/528 |
| 2016/0290297 A1 | * | 10/2016 | Batenburg ................ | F17C 9/00 |

FOREIGN PATENT DOCUMENTS

| | | | | |
|---|---|---|---|---|
| EP | 1213461 A2 | | 6/2002 | |
| FR | 2517367 | * | 3/1983 | ............. F02B 29/04 |
| FR | 2517367 A1 | * | 6/1983 | ............. F02B 29/04 |
| FR | 2517367 A1 | | 6/1983 | |
| WO | 02090750 A1 | | 11/2002 | |
| WO | 2009064971 A1 | | 5/2009 | |

OTHER PUBLICATIONS

Written Opinion of the International Searching Authority for Intatnational Application No. PCT/US2018/018657; Report dated May 17, 2018; 6 pages.

* cited by examiner

USE OF DECOMPRESSING NATURAL GAS TO LOWER THE INTAKE AIR TEMPERATURE OF AN INTERNAL COMBUSTION ENGINE

CROSS-REFERENCE TO RELATED APPLICATIONS

This application is a National stage of International Application No. PCT/US2018/018657 filed Feb. 20, 2018, which claims priority to U.S. Provisional Patent Application Ser. No. 62/462,469 filed Feb. 23, 2017, both of which are incorporated herein by reference in their entirety.

BACKGROUND

The embodiments herein generally relate to internal combustion engines and more specifically, fuel systems of internal combustion engines fueled by compressed natural gas or liquefied natural gas.

Typically, in internal combustion engines that utilize a natural gas engine, the natural gas must be compressed and stored in high pressure containers to be transportable. The compressed natural gas must be then decompressed to be consumed by the internal combustion engine. The natural gas is typically decompressed through a regulator but this decompression process is inefficient and improvements are desired.

BRIEF DESCRIPTION

According to one embodiment, a fuel system is provided. The fuel systems comprising: a fuel tank configured to store fuel, a pressure of the fuel within the fuel tank is equal to a first fuel pressure; an internal combustion engine fluidly connected to the fuel tank, the internal combustion engine being configured to consume fuel at a second fuel pressure lower than the first fuel pressure; a fuel regulator fluidly connecting the fuel tank to the internal combustion engine, the fuel regulator being configured to reduce the pressure of the fuel from the first fuel pressure to the second fuel pressure; an air supply assembly configured to supply air from an air inlet to the engine, the air assembly comprising: a first air supply line fluidly connecting the air inlet and the internal combustion engine, the first air supply line being in thermal communication with the fuel regulator; a second air supply line fluidly connecting the air inlet and the internal combustion engine, the second air supply line being in parallel with the first air supply line; and an air valve configured to adjust the air flowing through at least one of the first air supply line and the second air supply line.

In addition to one or more of the features described above, or as an alternative, further embodiments of the fuel system may include where the internal combustion engine is located gravitationally above the fuel regulator.

In addition to one or more of the features described above, or as an alternative, further embodiments of the fuel system may include: an air box within the first air supply line interposed between the inlet and the internal combustion engine, the air box containing the fuel regulator, wherein air within the first air supply line is configured to flow across the fuel regulator.

In addition to one or more of the features described above, or as an alternative, further embodiments of the fuel system may include: a controller in communication with the air valve and the internal combustion engine, the controller being configured control operation of the air valve in response to air temperature requirements of the internal combustion engine.

In addition to one or more of the features described above, or as an alternative, further embodiments of the fuel system may include where the air valve is located in the second air supply line.

In addition to one or more of the features described above, or as an alternative, further embodiments of the fuel system may include where the fuel is at least one of compressed natural gas, and liquid natural gas.

According to another embodiment, a method of providing fuel to an internal combustion engine is provided. The method comprising: storing fuel within a fuel tank, a pressure of the fuel within the fuel tank is equal to a first fuel pressure; consuming the fuel at a second fuel pressure lower than the first fuel pressure using an internal combustion engine, the internal combustion engine being fluidly connected to the fuel tank; reducing the pressure of the fuel from the first pressure to the second pressure using a fuel regulator, the fuel regulator fluidly connecting the fuel tank to the internal combustion engine; supplying air from an air inlet to the internal combustion engine using an air assembly, the air assembly comprising: a first air supply line fluidly connecting the air inlet and the internal combustion engine, the first air supply line being in thermal communication with the fuel regulator; and a second air supply line fluidly connecting the air inlet and the internal combustion engine, the second air supply line being in parallel with the first air supply line; and adjusting the air flowing through at least one of the first air supply line and the second air supply line, using an air valve.

In addition to one or more of the features described above, or as an alternative, further embodiments of the method may include where the internal combustion engine is located gravitationally above the fuel regulator.

In addition to one or more of the features described above, or as an alternative, further embodiments of the method may include where the air supply assembly further comprises: an air box within the first air supply line interposed between the inlet and the internal combustion engine, the air box containing the fuel regulator, wherein air within the first air supply line is configured to flow across the fuel regulator.

In addition to one or more of the features described above, or as an alternative, further embodiments of the method may include: controlling the operation of the air valve in response to air temperature requirements of the internal combustion engine using a controller in communication with the air valve and the internal combustion engine.

In addition to one or more of the features described above, or as an alternative, further embodiments of the method may include where the air valve is located in the second air supply line.

In addition to one or more of the features described above, or as an alternative, further embodiments of the method may include where the fuel is at least one of compressed natural gas, and liquid natural gas.

Technical effects of embodiments of the present disclosure include cooling the air flow into an internal combustion engine using the decompression of fuel flowing into the internal combustion engine. Technical effects also include locating the internal combustion engine gravitationally above the fuel regulator.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the Figures.

Figure 1:
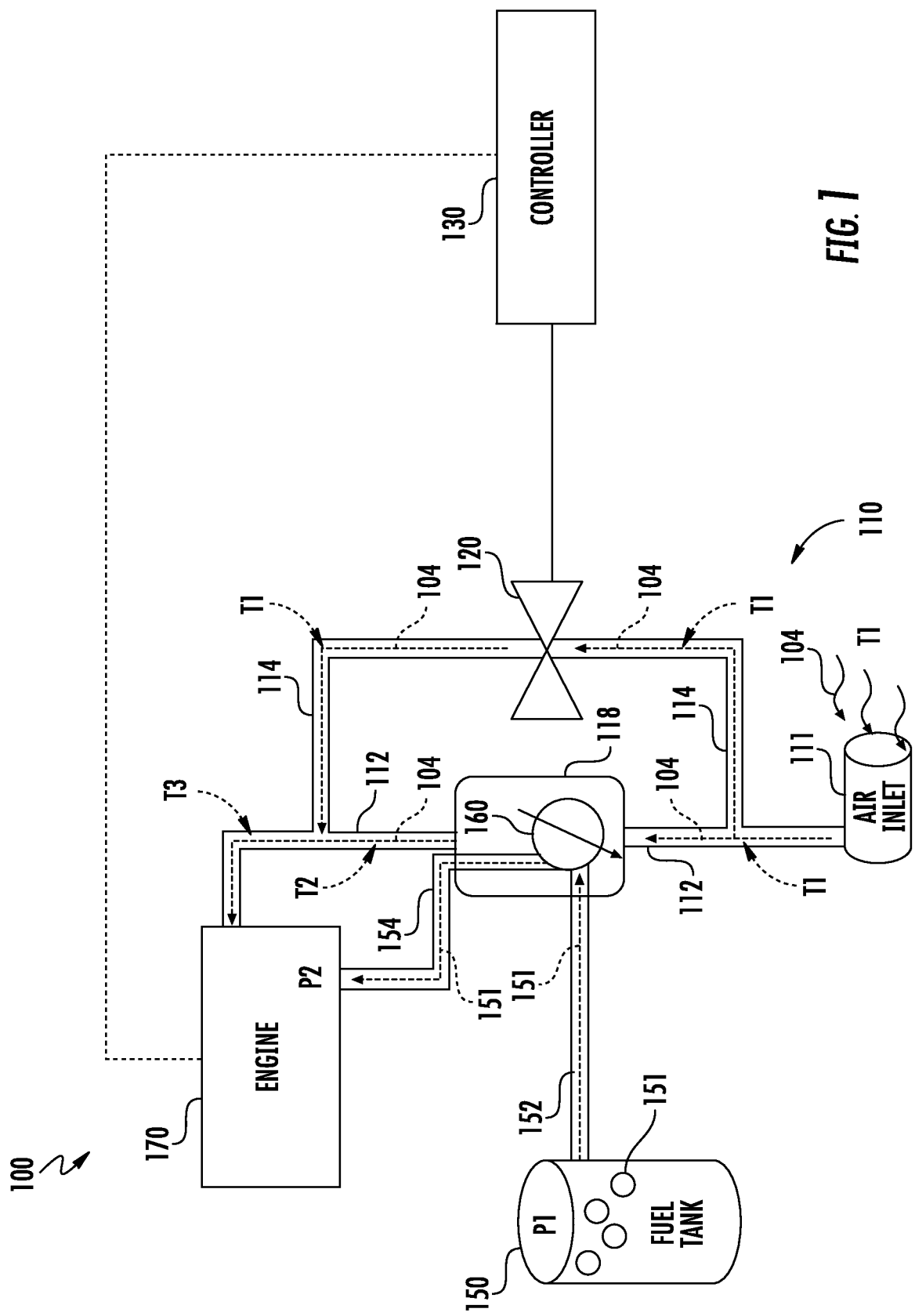
FIG. 1 is a schematic illustration of a fuel system of an internal combustion engine, according to an embodiment of the present disclosure.

Referring to FIG. 1, various embodiments of the present disclosure are illustrated. FIG. 1 shows a schematic illustration of a fuel system 100 of an internal combustion engine 170. The fuel system 100 comprises a fuel tank 150 configured to store fuel 151, an internal combustion engine 170 fluidly connected to the fuel tank 150, a fuel regulator 160 fluidly connecting the fuel tank 150 to the internal combustion engine 170, an air supply assembly 110 configured to supply air 104 from an air inlet 111 to the engine 170, and an air valve 120 configured to adjust the air 104 flowing through the air supply assembly 110. The fuel 150 may be compressed natural gas or liquid natural gas such as, for example, propane or butane. The fuel pressure of the fuel 151 within the fuel tank 150 is equal to a first fuel pressure P1. The internal combustion engine 170 is configured to consume fuel 151 at a second fuel pressure P2 lower than the first fuel pressure P1.

Current technology requires that natural gas be stored at a high pressure in order to achieve a practical amount of natural gas in the limited space of the storage tank 150. The natural gas must then be decompressed to a low pressure to be consumable by the internal combustion engine 170. For instance many tanks store natural gas at around 3600 PSI and then the natural gas must be decompressed to less than about 100 PSI for viable use in some internal combustion engines. The fuel regulator 160 is configured to reduce the pressure of the fuel 151 from the first fuel pressure P1 to the second fuel pressure P2. The fuel regulator 160 may be a single regulator or a series of regulators. In the illustrated embodiment, the fuel tank 150 is fluidly connected to the fuel regulator 160 through a first fuel line 152 and the fuel regulator 160 is fluidly connected to the engine 170 through a second fuel line 154.

In an embodiment, the internal combustion engine 170 is located gravitationally above the fuel regulator 160. Advantageously, positioning the internal combustion engine 170 gravitationally above the fuel regulator 160 allows fuel 151, in the event of a leak when the internal combustion engine 170 is off, to rise up the second fuel line 154 or the air intake line 112 and into the internal combustion engine 170 and be ready to be consumed upon the next start-up of the internal combustion engine 170. Advantageously, if the engine 170 is running and a leak develops the leaked fuel 151 is transported to the engine 170 via 112 and consumed. Also advantageously, if the leak is excessive then the fuel to air ratio imbalance will cause a warning in the controller 130 and require user intervention.

The air supply assembly 110 comprises: a first air supply line 112 fluidly connecting the air inlet 111 and the internal combustion engine 170; and a second air supply line 114 fluidly connecting the air inlet 111 and the internal combustion engine 170. The first air supply line 112 is in thermal communication with the fuel regulator 160. In the illustrated embodiment, the air supply assembly 110 includes an air box 118. The air box 118 is located within the first air supply line 112 interposed between the inlet 111 and the internal combustion engine 170. As seen in FIG. 1, the air box 118 contains the fuel regulator 160. As the air 104 within the first air supply line 112 flows through the air box 118, the air 104 flows across the fuel regulator 160, thus allowing thermal communication between the fuel regulator 160 and the air 104 within the air box 118. As the fuel regulator 160 reduces the pressure of the fuel 151, the temperature of the fuel 151 is reduced in accordance with the Joule-Thompson Effect. The cooling of the fuel 151 within the fuel regulator 160 cools the fuel regulator 160 and also cools the air 104 flowing across the fuel regulator 160 within the air box 118. Thus, the air 104 enters the air inlet 111 at first temperature T1 then flows through the air box 118 and across the fuel regulator 160, which reduces the temperature of the air 104 to a second temperature T2. The second temperature T2 is lower than the first temperature T1.

As mentioned above, the air supply assembly 110 includes a second air supply line 114 fluidly connecting the air inlet 111 and the internal combustion engine 170. As seen in FIG. 1, the second air supply line 114 is in parallel with the first air supply line 112. The air supply assembly 110 also includes an air valve 120 configured to adjust the air 104 flowing through at least one of the first air supply line 112 and the second air supply line 114. In the illustrated embodiment, the air valve 120 is located within the second air supply line 114 and adjusts the air 104 flowing through the second air supply line 114 by closing and opening the air valve 120. By adjusting the flow of air 104 through the second air supply line 114, the flow of air 104 through the first air supply line 112 is also adjusted. For instance, if the air valve 120 is closed then all the air 104 is forced to flow through the first air supply line 112. The first air supply line 112 supplies air 104 at a second temperature T2 to the internal combustion engine 170 and the second air supply line 114 supplies air at a first temperature T1 to the internal combustion engine 170. The two air supply line 112, 114 combine just prior to entering the internal combustion engine 170 and the air 104 in each air supply line 112, 114 mixes and the temperature of the mixed air 104 is equal to a third temperature T3 when entering the internal combustion engine 170. The third temperature T3 is adjusted by controlling the air valve 120 and adjusting the amount of air 104 flowing through each air supply line 112, 114. For instance, if more air 104 is forced to flow through the first air supply line 112 and across the fuel regulator 160 then the third temperature T3 will be cooler due to more air 104 arriving at the internal combustion engine 170 having the second temperature T2. Conversely, if more air 104 is forced to flow through the second air supply line 114 then the third temperature T3 will be hotter due to more air 104 arriving at the internal combustion engine 170 having the first temperature T1.

The fuel system 100 may also include a controller 130 in communication with the air valve 120 and the internal combustion engine 170. The controller 130 is configured control operation of the air valve 120 in response to air temperature requirements of the internal combustion engine 170. For example, if the internal combustion engine 170 requires that the air 104 flowing into the internal combustion engine 170 be cooler then the controller 30 will command the air valve 120 to allow more air 104 to flow through the first fuel line 112 and across the fuel regulator 160. In another example, if the internal combustion engine 170 requires that the air 104 flowing into the internal combustion engine 170 be hotter then the controller 30 will command the air valve 120 to allow more air 104 to flow through the second fuel line 114. The controller 130 may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

Figure 2:
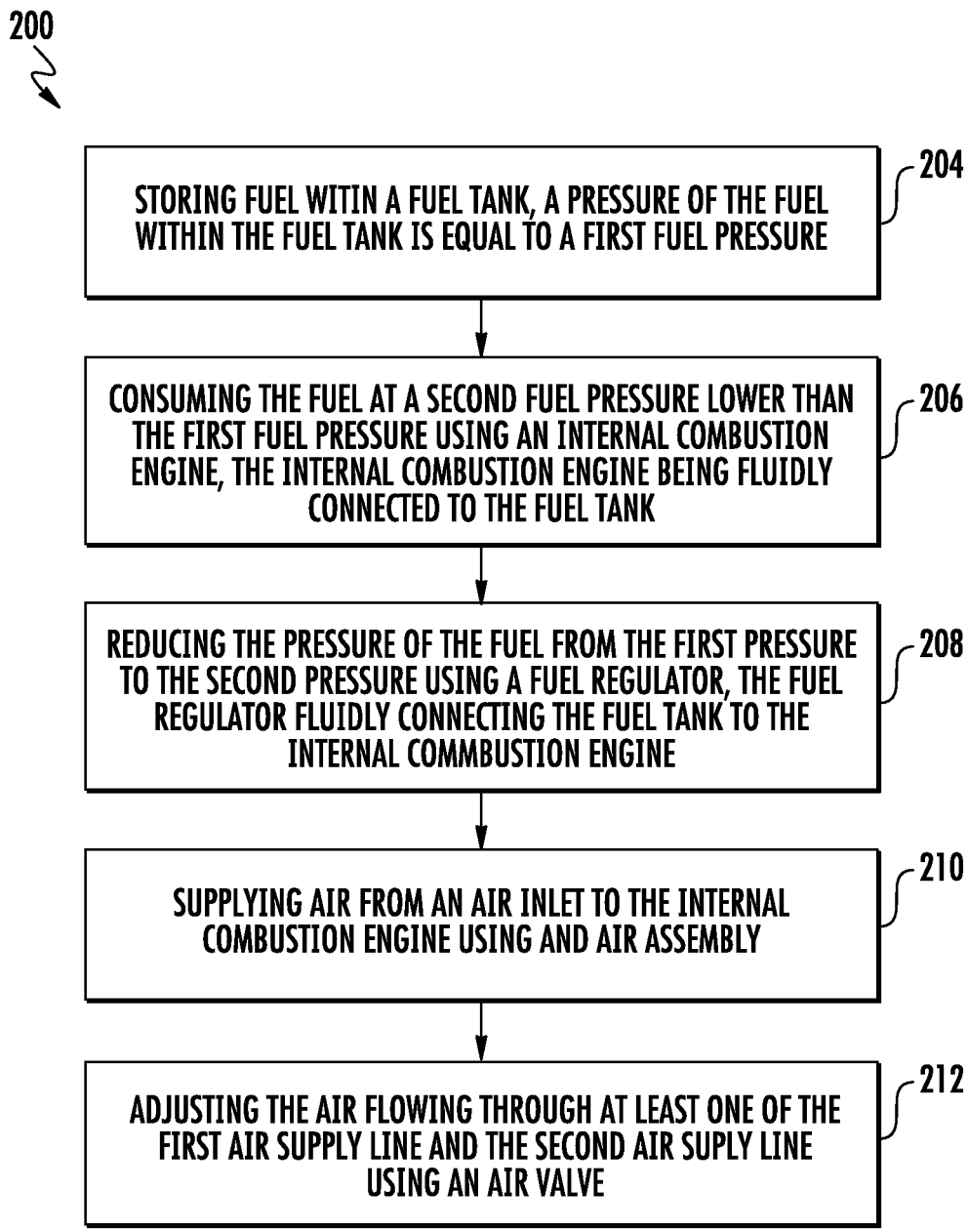
FIG. 2 is a flow diagram illustrating a method of providing fuel to an internal combustion engine, according to an embodiment of the present disclosure.

Referring now to FIG. 2 with continued reference to FIG. 1. FIG. 2 shows a flow diagram illustrating a method 200 of providing fuel to an internal combustion engine 170, according to an embodiment of the present disclosure. At block 204, a fuel tank 150 stores fuel 151. A pressure of the fuel 151 within the fuel tank 150 is equal to a first fuel pressure P1. At block 206, an internal combustion engine 170 consumes the fuel 151 at a second fuel pressure P2 lower than the first fuel pressure P1. As mentioned above, the internal combustion engine 170 is fluidly connected to the fuel tank 150. At block 208, the pressure of the fuel 151 is reduced from the first pressure P1 to the second pressure P2 using a fuel regulator 160. The fuel regulator 160 fluidly connecting the fuel tank 150 to the internal combustion engine 170. At block 210, air 104 is supplied from an air inlet 111 to the internal combustion engine 170 using an air assembly 110. As mentioned above, the air assembly 110 comprises: a first air supply line 112 fluidly connecting the air inlet 111 and the internal combustion engine 170. The first air supply line 112 is in thermal communication with the fuel regulator 160. As mentioned above, the first air supply line 112 may be in thermal communication with the fuel regulator 160 through the air box 118. The air assembly 110 further comprises: a second air supply line 114 fluidly connecting the air inlet 111 and the internal combustion engine 170. As seen in FIG. 1, the second air supply line 114 is in parallel with the first air supply line 112. At block 212, the air flowing through at least one of the first air supply line 112 and the second air supply line 114 is adjusted using an air valve 120.

While the above description has described the flow process of FIG. 2 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fuel system comprising:
   a fuel tank configured to store fuel, a pressure of the fuel within the fuel tank is equal to a first fuel pressure;
   an internal combustion engine fluidly connected to the fuel tank, the internal combustion engine being configured to consume fuel at a second fuel pressure lower than the first fuel pressure;
   a fuel regulator fluidly connecting the fuel tank to the internal combustion engine, the fuel regulator being configured to reduce the pressure of the fuel from the first fuel pressure to the second fuel pressure;
   an air supply assembly configured to supply air from an air inlet to the engine, the air assembly comprising:
   a first air supply line fluidly connecting the air inlet and the internal combustion engine, the first air supply line being in thermal communication with the fuel regulator;

a second air supply line fluidly connecting the air inlet and the internal combustion engine, the second air supply line being in parallel with the first air supply line; and an air valve configured to adjust the air flowing through at least one of the first air supply line and the second air supply line, wherein the internal combustion engine is located gravitationally above the fuel regulator.

2. The fuel system of claim 1, further comprising:

an air box within the first air supply line interposed between the inlet and the internal combustion engine, the air box containing the fuel regulator, wherein air within the first air supply line is configured to flow across the fuel regulator.

3. The fuel system of claim 1, further comprising:

a controller in communication with the air valve and the internal combustion engine, the controller being configured control operation of the air valve in response to air temperature requirements of the internal combustion engine.

4. The fuel system of claim 1, wherein:

the air valve is located in the second air supply line.

5. The fuel system of claim 1, wherein:

the fuel is at least one of compressed natural gas, and liquid natural gas.

6. A method of providing fuel to an internal combustion engine, the method comprising:

storing fuel within a fuel tank, a pressure of the fuel within the fuel tank is equal to a first fuel pressure;

consuming the fuel at a second fuel pressure lower than the first fuel pressure using an internal combustion engine, the internal combustion engine being fluidly connected to the fuel tank;

reducing the pressure of the fuel from the first pressure to the second pressure using a fuel regulator, the fuel regulator fluidly connecting the fuel tank to the internal combustion engine;

supplying air from an air inlet to the internal combustion engine using an air assembly, the air assembly comprising:

a first air supply line fluidly connecting the air inlet and the internal combustion engine, the first air supply line being in thermal communication with the fuel regulator; and a second air supply line fluidly connecting the air inlet and the internal combustion engine, the second air supply line being in parallel with the first air supply line; and adjusting the air flowing through at least one of the first air supply line and the second air supply line, using an air valve, wherein the internal combustion engine is located gravitationally above the fuel regulator.

7. The method of claim 6, wherein the air supply assembly further comprises:

an air box within the first air supply line interposed between the inlet and the internal combustion engine, the air box containing the fuel regulator, wherein air within the first air supply line is configured to flow across the fuel regulator.

8. The method of claim 6, further comprising:

controlling the operation of the air valve in response to air temperature requirements of the internal combustion engine using a controller in communication with the air valve and the internal combustion engine.

9. The method of claim 6, wherein:

the air valve is located in the second air supply line.

10. The method of claim 6, wherein:

the fuel is at least one of compressed natural gas, and liquid natural gas.

* * * * *